(12) United States Patent
Penca et al.

(10) Patent No.: US 11,965,443 B2
(45) Date of Patent: Apr. 23, 2024

(54) GAS FLOW AND SOUND CONTROL VALVE FOR EXHAUST GAS SYSTEM

(71) Applicant: Akrapovic d.d., Grosuplje (SI)

(72) Inventors: Jure Penca, Domzale (SI); Igor Akrapovic, Ljubljana (SI)

(73) Assignee: Akrapovic D.D., Ivancna Gorica (SI)

( * ) Notice: Subject to any disclaimer, the term of this patent is extended or adjusted under 35 U.S.C. 154(b) by 453 days.

(21) Appl. No.: 17/297,426

(22) PCT Filed: Nov. 15, 2019

(86) PCT No.: PCT/EP2019/081533
§ 371 (c)(1),
(2) Date: May 26, 2021

(87) PCT Pub. No.: WO2020/109036
PCT Pub. Date: Jun. 4, 2020

(65) Prior Publication Data
US 2022/0049635 A1 Feb. 17, 2022

(30) Foreign Application Priority Data

Nov. 27, 2018 (EP) .................................... 18208611

(51) Int. Cl.
*F01N 1/16* (2006.01)
*F01N 1/18* (2006.01)
(Continued)

(52) U.S. Cl.
CPC ............. *F01N 1/163* (2013.01); *F01N 1/168* (2013.01); *F01N 1/18* (2013.01); *F01N 13/04* (2013.01);
(Continued)

(58) Field of Classification Search
CPC . F01N 1/163; F01N 1/168; F01N 1/18; F01N 13/04; F01N 13/087;
(Continued)

(56) References Cited

U.S. PATENT DOCUMENTS 9,845,893 B2 * 12/2017 Elsaesser .............. F01N 13/002
11,492,965 B1 * 11/2022 Krejci ................... F02B 37/183
(Continued)

FOREIGN PATENT DOCUMENTS

DE  10 2010 003 301 A1  5/2011
EP      0 283 240 A2     9/1988
(Continued)

*Primary Examiner* — Hoang M Nguyen
(74) *Attorney, Agent, or Firm* — BakerHostetler

(57) ABSTRACT

Gas flow and sound control valve for an exhaust system of an internal combustion engine comprising a housing including an inlet, a first outlet, and a second outlet, and a valve member arranged within the housing for forming a first conduit connecting the inlet to the first outlet and/or a second conduit from the inlet to the second outlet, wherein the valve member can be moved relative to the housing between a first predetermined position in which the valve member closes the second conduit and a second predetermined position in which the valve member closes the first conduit, whereby the valve member is rotatable around a valve axis aligned parallel, in particular coaxial, to a centerline of the inlet.

14 Claims, 3 Drawing Sheets

(51) Int. Cl.
*F01N 13/04* (2010.01)
*F01N 13/08* (2010.01)
*F16K 11/08* (2006.01)

(52) U.S. Cl.
CPC ............ *F01N 13/087* (2013.01); *F16K 11/08* (2013.01); *F01N 2240/36* (2013.01); *F01N 2260/14* (2013.01); *F01N 2470/14* (2013.01); *F01N 2590/04* (2013.01)

(58) Field of Classification Search
CPC ............ F01N 2240/36; F01N 2260/14; F01N 2470/14; F01N 2590/04; F16K 11/08
USPC ........................................................ 60/324
See application file for complete search history.

(56) References Cited

U.S. PATENT DOCUMENTS

| | | | |
|---|---|---|---|
| 2003/0192606 A1 | 10/2003 | Heckt | |
| 2018/0252131 A1* | 9/2018 | Akrapovic | ............ F01N 1/166 |
| 2020/0173348 A1* | 6/2020 | Sharp | ................ F02B 37/18 |

FOREIGN PATENT DOCUMENTS

| | | |
|---|---|---|
| EP | 3 118 429 A1 | 1/2017 |
| EP | 3 141 702 A1 | 3/2017 |
| EP | 3 141 720 A1 | 3/2017 |
| FR | 2 577 646 A1 | 8/1986 |

* cited by examiner

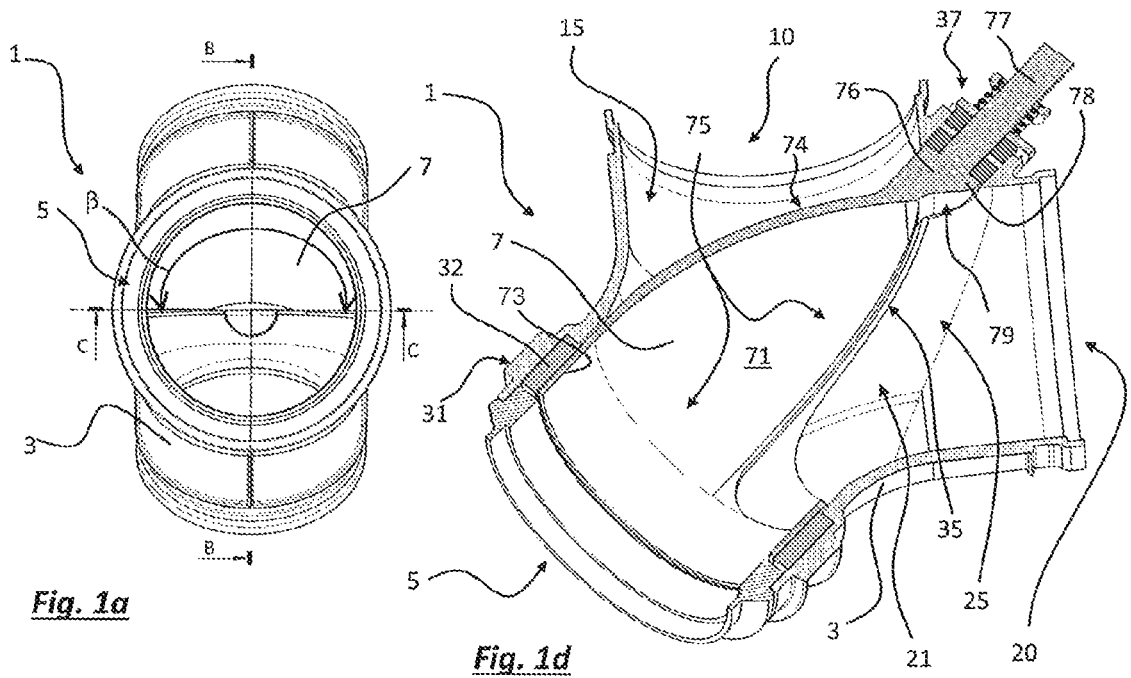
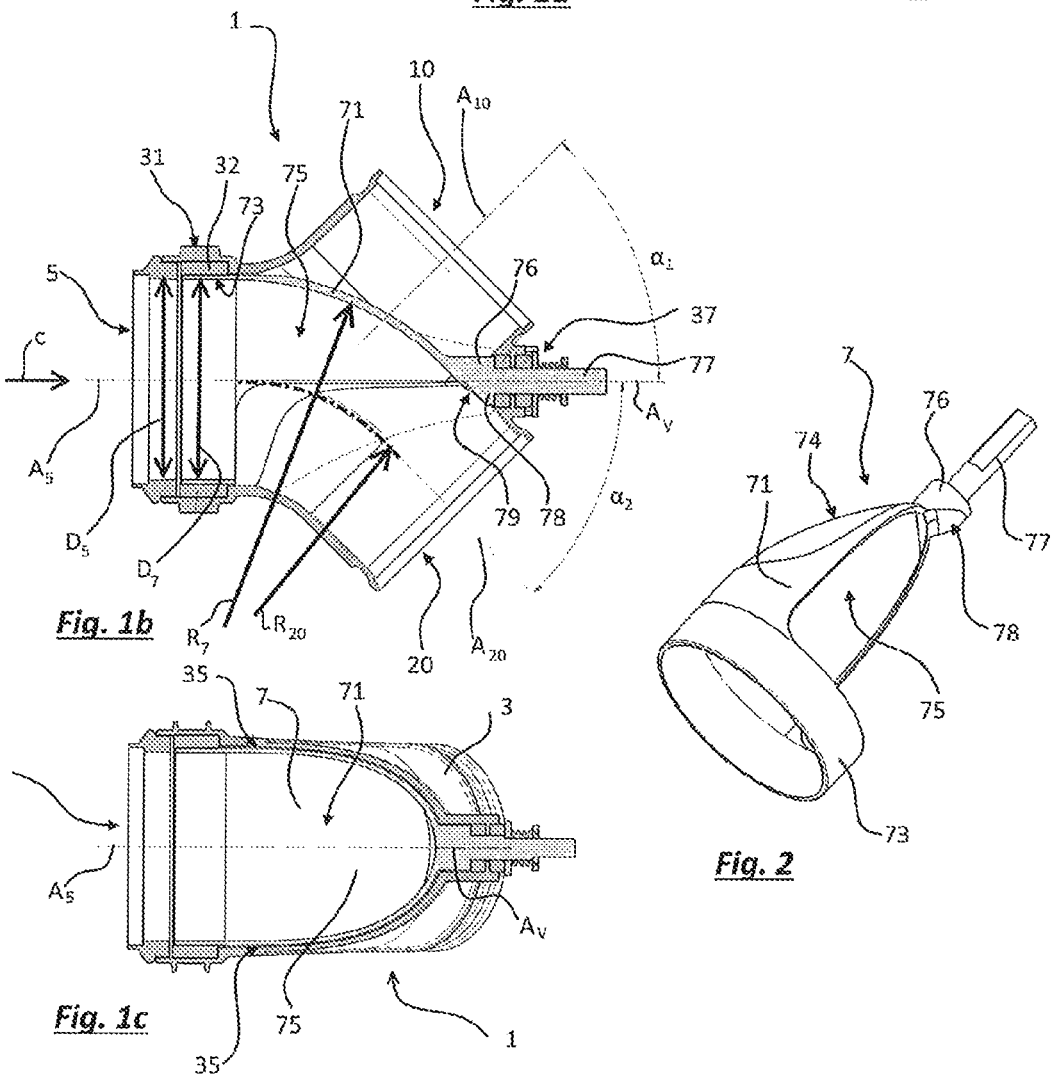
Fig. 1a
Fig. 1d
Fig. 1b
Fig. 1c
Fig. 2

GAS FLOW AND SOUND CONTROL VALVE FOR EXHAUST GAS SYSTEM

CROSS-REFERENCE TO RELATED APPLICATIONS

This application is a National Stage of International patent application PCT/EP2019/081533, filed on Nov. 15, 2019, which claims priority to foreign European patent application No. EP 18208611.6, filed on Nov. 27, 2018, the disclosures of which are incorporated by reference in their entirety.

FIELD OF THE INVENTION

The invention relates to a gas flow and sound control valve for an exhaust system of an internal combustion engine. The invention further relates to an exhaust gas system of an internal combustion engine comprising at least one gas flow and sound control valve. Particularly, the invention relates to an exhaust system and/or gas flow and sound control valve for an automotive internal combustion engine.

In particular, the exhaust system or valve of the invention may be used in conjunction with a V-engine, a boxer engine or any type of internal combustion engine. Typical high-performance internal combustion engines have a left group of cylinders and a right group of cylinders, each of which may be connectable to an individual left or right exhaust tract. In such an exhaust system, each exhaust tract, the left exhaust tract and the right exhaust tract, comprises a respective tract structure which defines a tract inlet into which the exhaust gas is injection from the respective left or right group of cylinders. The exhaust system may comprise one or more exhaust outlets opening into the atmosphere for releasing exhaust gas from the exhaust system.

BACKGROUND

US 2003/0192606 A1 describes a switch valve or gas flow control valve for guiding exhaust gas from one inlet to a first or second outlet. The switch valve includes a housing in which an inlet, a first outlet and a second outlet are formed. A directional control member in the form of a swinging flap is located within the housing and either the first outlet or the second outlet may selectively be closed, as a result of which the respective other outlet is in connection to the inlet. The switch valve according to US 2003/0192606 A1 is designed to minimize production efforts and to achieve a simple structure. The switch valve of US 2003/0192606 A1 is not suitable for an undisturbed transmission of sound from the inlet to either one of the outlets. Furthermore, due to the multitude of undercuts, the contorted geometry, an undesirable loss of power particularly of high performance engines may be caused.

EP 3 141 702 A1 describes an exhaust system in which Y-shaped pipe junctions are arranged upstream from valve devices which may be used to shut down or open the transmission exhaust gas through a main exhaust outlet or a bypass exhaust outlet. If poorly designed, such an arrangement may lead to an unintended echo chamber resulting in undesirable sound emission. Furthermore, by leaving the bypass exhaust line open, a controlled division of the exhaust gas from the engine through the lines downstream of the Y-shaped junction can only be achieved up to a limited extent, unless further valves used up- or downstream of the Y-shaped junction.

SUMMARY OF THE INVENTION

It is an object of the invention to overcome the disadvantages of the prior art, particularly to provide an improved exhaust system or gas flow and sound control valve for an internal combustion engine, particularly to provide a valve or system which is improved regarding its efficiency and controllability.

This object is solved by the features of the independent claims.

The subject matter of the invention relates to a gas flow and sound control valve for an exhaust system of an internal combustion engine, particularly an automotive engine. The gas flow and sound control valve comprises a housing including an inlet, a first outlet and a second outlet. In particular, the housing includes exactly one inlet. The first outlet and/or the second outlet may be of the same or a different size, in particular of area, as the inlet period. In particular, the inlet is of the same shape, preferably cylindrical or oval, in particular of the same diameter, as the first and/or second outlet. A valve member is arranged within the housing for forming a first conduit connecting the inlet to the first outlet and/or a second conduit from the inlet to the second outlet. In particular, the gas flow and sound control valve may comprise a one-piece valve member. The valve member can be moved relative to the housing between a first predetermined position in which the valve member closes the second conduit in particular completely and a second predetermined position in which the valve member closes the first conduit in particular completely.

In the gas flow and sound control valve according to the invention, the valve member is rotatable around a valve axis applied parallel to a centerline of the inlet. The inlet may be cylindrical. In particular, the valve axis may be coaxial to the center line of the inlet.

By arranging the valve member within the housing having one inlet and a first and second outlet, the exhaust gas flow may be divided from the inlet into the first outlet and/or into the second outlet without additional valve means. Such an arrangement may improve the aerodynamics and exhaust gas system and thereby improve the system efficiency to avoid any loss of power. Furthermore, the invention allows to avoid undercuts and other controlled design so as to avoid any backflow, vortices and echoes associated therewith.

According to one embodiment, the valve member comprises a spoon-shaped section for guiding the exhaust gas from the inlet through the first conduit and/or through the second conduit. Said spoon-shaped section may be shaped in a convex manner relative to the valve axis. In particular, the spoon-shaped section is dimensioned such that it covers the second conduit in the predefined first position and such that it covers the first conduit in the predefined second position. The spoon-shaped section of the valve member may cover the first or second conduit completely. It may be sufficient for a suitable control of the exhaust gas flow if the spoon-shaped section covers the first conduit or the second conduit only to a major extent. For example, it may be sufficient if the spoon-shaped section covers two-thirds, three-quarters, 90%, 95% or 99% of the respective first or second conduit in the respective predefined second or first position.

According to a further development, a spoon-shaped section extends in the circumferential direction around the valve axis for at least 170° and/or at the most 220°. It may be preferred that the spoon-shaped section extends in the circumferential direction around the valve axis for at least 180°. It may be preferred that the spoon-shaped section extends in the circumferential direction around the valve axis for at the most 210° or at the most 195°. In particular, the spoon-shaped section may extend along an axial extension (parallel to the valve axis) along the valve axis of more than 3 cm and/or less than 15 cm. In particular, the spoon-shaped section may extend along the axial extension of the valve axis for more than 5 cm and/or less than 10 cm.

According to one embodiment of the gas flow and sound control valve, an inside surface of the spoon-shaped section defines a curved flow path for the exhaust gas defining a radius of curvature. The inside surface of the spoon-shaped section may define a continuously curved, particularly pipe-like, flow path. The pipe-like flow path may have a constant cross-section and/or a continuous cross-section, particularly free of contortions and/or undercuts. The spoon-shaped section may be formed such that it defines an approximately constant cross-section of the flow path when this valve member is in the first predetermined position und such that it defines an approximately constant cross-section of the flow path when the valve member is arranged in the second predetermined position.

According to a further development, the housing is Y-shaped, wherein the centerline of the outlet may be arranged with an angular offset relative to the centerline of the inlet and/or to the valve exit. In particular, the first outlet and the second outlet may be arranged with an individual angular offset, wherein the angular offset of the first outlet may be different from the angular offset of the second outlet. In particular, the angular offset of the first outlet and/or of the second outlet may be between 10° and 120° relative to the centerline of the valve axis and/or the centerline of the inlet. In particular, the angular offset of the centerline of the first outlet and/or of the second outlet may be offset at 45° relative to the centerline of the inlet and/or the valve axis. In a particular embodiment of the invention, the centerline of the inlet, the centerline of the first outlet and of the second outlet and the valve axis are coplanar.

In particular, the housing defines a first radius of curvature spanning from the inlet to the first outlet. In particular, the housing defines a second radius of curvature spanning from the inlet to the second outlet. In a first predefined position, the radius of curvature of the valve member may correspond to the respective first radius of curvature. In the second predefined position, the radius of curvature of the valve member may correspond to the second radius of curvature.

According to one embodiment, the spoon-shaped section defines an inner surface which, in the first or second predefined position, merges with an inner conduit surface of the respective (first or second) conduit to define a boundary for the exhaust gas flow path resembling that of a bent pipe. In other words, if the valve member is arranged in either one of the first or second predetermined positions, the valve member essentially may be designed to realize the properties of a bent pipe, particularly of a constant radius of curvature and/or of a constant cross-section, for optimal aerodynamic properties. In a preferred embodiment, in the first or second predetermined position, the valve may define a boundary for the exhaust gas flow path resembling that of a pipe comprising exactly one bend. In particular, the flow path may be that of a bent pipe formed free of obstacles, preferably free of obstacles within the first and/or second conduit.

In a further development, the path of exhaust gas flowing through the inlet along the valve member to the first or second outlet (in the respective first or second predetermined position) through the respective conduit may define an essentially constant cross-sectional area. In a preferred embodiment, the constant cross-sectional area may be a constant circular cross-sectional area. Optionally, an inlet funnel may be arranged upstream of the inlet for guiding the path from another cross-section, such as an elliptical cross-section, a rectangular cross-section, or any other cross-section, to the cross-sectional area of the inlet. Preferably, the cross-sectional area of the inlet is circular or oval. The inlet and the first and/or second outlet may be provided with the same cross-sectional shape and/or dimensions.

In a further development of the invention, which may be combined with a previous one, a gap may be defined in the direction radial relative to the valve axis between a radial outer surface of the spoon section and the housing at least partially along the axial extension of the spoon section. By providing a gap radially between the outer surface of the spoon section and the inner surface of the housing, friction and thus wear between the spoon section and the housing is avoided thereby improving the controllability of the valve and its reliability. The direction in which the gap may be arranged between the spoon section and the housing may be aligned across relative to the plane of the conduit. For example, if the inlet and the outlets have centerlines arranged in the same plane, the gap may be arranged between the housing and the valve member in the direction perpendicular to said plane.

In one embodiment, the gas flow and sound control valve is provided with a valve member rotatably mounted to the housing with an upstream bearing at the inlet, wherein the valve member includes a ring section coaxially surrounding the valve axis partially or completely and engaging the upstream bearing. The bearing may be realized as a sliding bushing. Preferably, the bearing is a radial bearing. Alternatively, the bearing may be an axial bearing. The ring section of the valve member may be completely circumferentially surrounding the valve axis. The ring section may radially engage the upstream bearing. The upstream bearing may be arranged upstream from the division into the first outlet and second outlet. Downstream of the inlet a ring-shaped section may be described as a collar of the valve member. A collar or ring section may be arranged in the proximity of the upstream end of the particularly spoon-shaped valve member.

According to a further embodiment, which may be combined with the embodiment previously described, the valve member is rotatably mounted to the housing with a central bearing, in particular an axial bearing, arranged in the housing between the first outlet and the second outlet, wherein the valve member includes a shaft section aligned coaxially with the valve axis and extending through the central bearing and through the housing. Alternatively, the central bearing may be a radial bearing. The valve member and the shaft section may be formed integrally of one piece. A central bearing may be arranged in the proximity of the downstream tip of the particularly spoon-shaped valve member. It may be sufficient to provide a valve with either a central bearing or an upstream bearing. In a preferred embodiment, the valve is provided with both a radial upstream bearing and an axial central bearing allowing for a smooth movement and improved controllability of the valve and a high resistance to undesirable noise emissions from a valve member. In an alternative embodiment, the valve may be provided with an axial upstream bearing and a radial central bearing. Prior art switch valves are known to emit undesirable whistling and/or clicking sounds in some operating conditions.

According to a further development, the valve member includes a wedge-shaped transition section arranged between the spoon section and the shaft section. The transition section may define a shoulder wider than the shaft section and engaging the central bearing relative to the valve axis. The shaft section may define a shaft section radius smaller than the outer radius of the shoulder. Additionally or alternatively, when the valve member is in the first predefined position or in the second predefined position, the transition section extends radially from the upstream tip of the spoon section into the respective open conduit.

The transition section may have a transition surface shaped corresponding to that of the respective open conduit, which transition surface connects the conduit surface of the conduit to the inside surface of the particularly spoon-shaped valve member.

In one embodiment, the gas flow and sound control valve comprises an actuator for manipulating the valve member, wherein the actuator is configured, for example by means of an electronic control element and/or a mechanical transmission, to arrange the valve member in at least one intermediate position between the first and second predefined positions such that the valve member is positioned for guiding the exhaust gas flow and sound from the inlet to both the first outlet. In the at least one intermediate position, the valve member may partially cover the first conduit and partially cover the second conduit. The actuator may be configured to arrange the valve member in at least 3 or at least 5 different intermediate positions between the first and second predefined position. The actuator may be configured to arrange the valve member in a multitude of more than 5 intermediate positions, preferably be configured to arrange the valve member continuously in any intermediate position between the first predetermined position and the second predetermined position.

The gas flow and sound control valve may be configured to either direct exhaust gas only to at least one acoustic element of the first tract, or only to at least one acoustic element of the second tract, or proportionally to the at least one acoustic element of each of the first and second tracts with. In particular, each of the at least one acoustic elements may be designed as an impasse to redirect exhaust gas to and through the gas flow and sound control valve. In particular, said redirected exhaust gas exits the gas flow and sound control valve via its inlet.

The gas and sound control valve may, in the first predetermined position, direct exhaust gas flowing to the first outlet, or in the second predetermined position, to the second outlet, and a respective acoustic element connected to the respective outlet. Additionally, the gas flow and sound control valve may direct exhaust gas from the inlet partially to the first outlet and to the second outlet, when the valve member is arranged in an intermediate position. For example, the first predetermined position may be a 0° position of the valve member relative to the housing and the second predetermined position may be a 180° position. When the valve member is moved from the first predetermined position (0°) to a second predetermined position (180°), the first conduit is gradually closed and the second conduit is gradually opened as the valve member moves about the valve axis. The flow distribution of exhaust gas from the inlet through the first conduit and through the second conduit may be proportional to the ratio of the respective open cross-sections of the first and second conduit. It shall be clear that the open area of the conduit is that area not currently covered by the valve member.

According to one embodiment, the upstream end of the valve member, particularly the ring section or collar, and the inlet are concentrically, preferably coaxially, aligned and/or have preferably identical inner diameters corresponding to one another. By designing the inner diameter of the upstream inlet with the same dimension as a collar or ring section of the rotatable valve member at its upstream end, any undercuts which might disturb exhaust gas airflow between the inlet and the valve member can be avoided thereby providing for an acoustically and aerodynamically improved geometry.

The invention also relates to an exhaust gas system of an internal combustion engine comprising at least one gas flow and sound control valve arranged in a distribution junction between the internal combustion engine and at least one acoustic element, wherein a first tract of the exhaust gas system is connected to the first outlet of the valve and a second tract of the exhaust gas system is connected to the second outlet. In particular, each tract comprises at least one acoustic element, such as a resonator, an expansion chamber, a Helmholtz resonator, a muffler, an absorption muffler, or the like.

Such an exhaust gas system has displayed improved acoustic and aerodynamic characteristics in comparison to known exhaust systems in which switch valves or valves arranged downstream from a junction in one of its outlet tracts are provided.

In one embodiment, the exhaust gas system further comprises at least one unification junction downstream of the distribution junction where the first tract and the second tract are rejoined. In such an exhaust gas system, an acoustic element may be provided by designing the tract sections between the distribution junction and the unification junction with different lengthwise extensions, in particular so that sound waves travelling from the distribution junction to the unification junction may positively or negatively interfere downstream of the unification junction. A negative interference may result in a silencing of the sound emission and a positive interference may result in controlled increase in sound emission, particularly in a predetermined range of frequencies (bandwidth).

According to one embodiment that may be combined with either previous one, the exhaust gas system comprises a right exhaust tract for exhaust gas from a first group of engine cylinders and a left exhaust tract for exhaust gas from a second group of engine cylinders. The right and left tracts each comprise at least one gas flow and sound control valve. Such an exhaust gas system thus comprises at least two gas flow and sound control valves according to the invention. The exhaust system further comprises at least one common exhaust gas manipulating device, such as an exhaust gas cleaning and/or silencing device, connected to the first outlets of the respective gas flow and sound control valve of the left tract and of the right exhaust tract, such that exhaust gas coming from the right and left exhaust tracts is unified within said common exhaust gas manipulating device.

A common exhaust gas manipulating device is described for example in EP 3 118 429 A1. By using the respective right gas flow and sound control valve for the right group of engine cylinders and a respective left gas flow and sound control valve for the exhaust gas of the left group of engine cylinders, exhaust gas can be led from the respective group of cylinders through the respective exhaust gas flow and sound control valve. Such an exhaust system may comprise sections that can be fed, through the first outlets of the valves from exhaust gas of both groups of cylinders (common section), as well as sections, that will receive exhaust gas from only one group of cylinders (bypass section). A bypass section downstream of the valves' respective second outlets may be desired to carry exclusively exhaust gas from one respective group of cylinders to flow separate from any exhaust gas ejected from the respective other group of cylinders. A common section downstream of the valves may receive exhaust gas from both groups of cylinders. The common section downstream of the valves can also be supplied with exhaust gas from only one group of cylinders or the other exclusively, by controller the left and right valve accordingly. For example, the right valve may be controlled such that its valve member is arranged in its second predetermined position so that exhaust can flow from its inlet flows to practically only the second outlet and the bypass section connected thereto. The left tract's valve may be arranged in its first position to guide exhaust gas into the common section downstream of the left valve. The left valve may alternatively be arranged in an intermediate position to distribute exhaust gas partially into the common exhaust gas tract section and partially into the left exhaust gas tract's bypass section.

In a further development, the right exhaust tract and the left exhaust tract each comprise at least one bypass line connected to the respective second outlets of the respective valves. In particular the exhaust gas manipulating device is connected to at least one discharge line leading to at least one of the bypass lines. The exhaust gas manipulating device can alternatively have exhaust tracts that never reconnect to any one of the left and/or right bypass lines.

According to one embodiment, at least one gas flow control valve of an exhaust gas system is arranged in an impasse side tract and connected with its inlet to a main tract and with each of its outlets to at least one respective impasse acoustic element. The term main tract as used here means a tract that, at least indirectly, connects the engine to the atmosphere. It may be a left main tract, a left bypass tract, a right main tract, a right bypass tract, or a common exhaust tract. In particular, each of the impasse acoustic elements can exclusively vent to the atmosphere via the main line by reversing exhaust gas flow from the impasse acoustic element in particular through the at least one gas flow control valve arranged in the impasse side tract.

BRIEF DESCRIPTION OF THE DRAWINGS

Further embodiments, features and technical aspects are described in the subclaims. Further details of the preferred embodiments of the invention are shown in the enclosed Figures.

FIG. 1a a frontal view of a gas flow and sound control valve according to one embodiment;

FIG. 1b a cross-sectional view along the sectional line B-B of the valve according to FIG. 1a;

FIG. 1c a cross-sectional view along the sectional line C-C of the valve shown in FIG. 1a;

FIG. 1d a perspective cross-sectional view of the valve shown in FIG. 1a along the line B-B;

FIG. 2 a perspective view of the valve member of the gas flow and sound control valve as shown in FIGS. 1a through 1d;

FIG. 3c a cross-sectional view along the line C-C of the valve shown in FIG. 3a;

FIG. 3d a cross-sectional view along the line D-D of the valve shown in FIG. 3a;

DETAILED DESCRIPTION

Figure 3A:
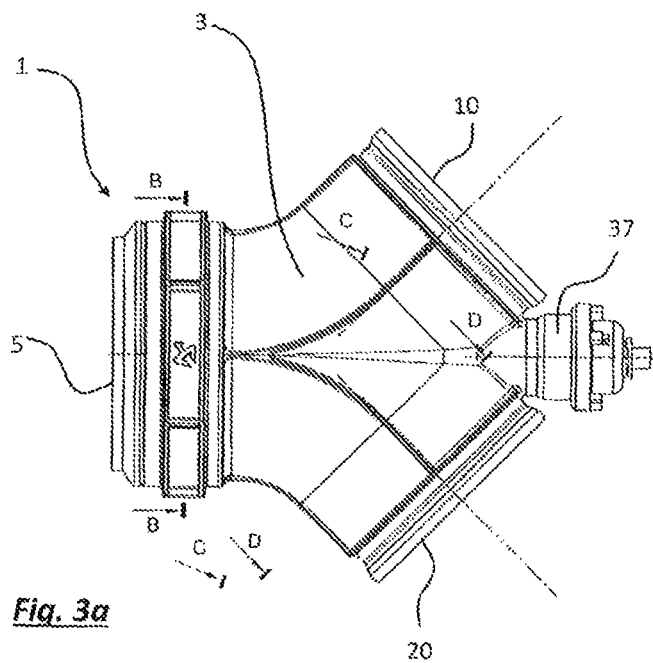
FIG. 3a a top view onto a gas flow and sound control valve according to one embodiment.
Figure 3B:
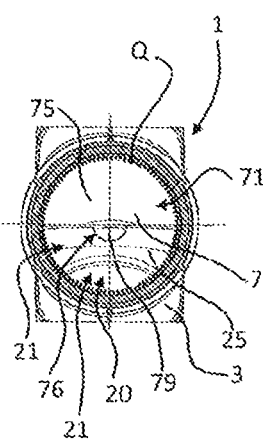
FIG. 3b a cross-sectional view of the valve shown in FIG. 3a along the line B-B.

In the following description of preferred embodiments of the invention in accordance with the Figures, the same or similar reference numerals are used to designate the same or similar components.

A gas flow and sound control valve is generally designated with reference numeral 1. For ease of reading, the term "valve" shall be used in the description of the embodiments shown in the Figures instead of the term "gas flow and sound control valve" to designate the same.

Figure 7:
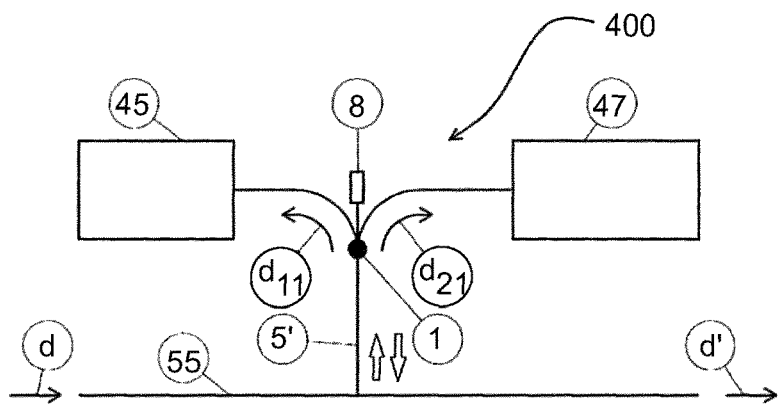
FIG. 7 a schematic view of a section of a gas flow and sound control valve including a main tract and an impasse side tract including a gas flow and sound control valve.
Figure 4:
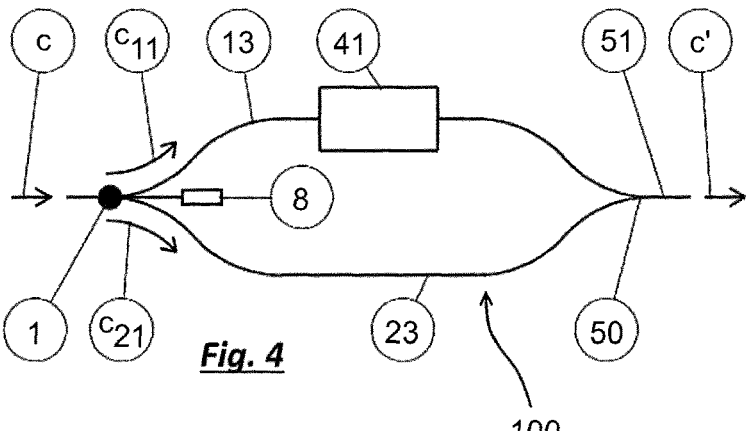
FIG. 4 a schematic illustration of an exhaust gas system including a gas flow and sound control valve.

The reference numerals 100, 200, 300 and 400 designate different exhaust gas system sections. It shall be understood that the architectures shown in the different Figures can be realized individually or in any combination. For example, one of the two tracts upstream from the valves shown in FIGS. 5 and 6 may each include an exhaust gas system as shown in FIGS. 4 and/or 7. Similarly, each of the four tracts downstream of the valves shown in FIGS. 5 and 6 may include one or both of the systems shown in FIGS. 4 and 7. Furthermore, it is conceivable that the system shown in FIG. 4 may include in one or both tracts downstream of the valve a system as shown in FIG. 7. Alternatively or additionally, the system shown in FIG. 7 can be arranged upstream of the valve of the embodiment shown in FIG. 4 or downstream of the unification junction of the embodiment shown in FIG. 4.

It is a general concept realized in the exhaust gas flow and sound control valve 1 as shown in FIGS. 1a through 1d and 3a through 3d that exhaust gas may be led from one inlet to one outlet or another one outlet of said valve, while providing a throughflow area that resembles that of a bent tube having a (almost) constant, cylindrical cross-section. This is described in detail particularly with respect to FIGS. 3a through 3d below. Such an aerodynamically optimized shape devoid of undercuts and of pockets allows the exhaust gas to stream from the inlet to a first or to a second outlet nearly without loss of power and without impairing the exhaust system's sound emissions, thereby leading to improved sound quality and engine efficiency.

The gas flow and sound control valve 1 includes as its main constituents a housing 3 and a valve member 7 arranged within the housing 3. The housing 3 may be designed approximately having a Y-shape. The housing 3 includes an inlet 5, a first outlet 10 and a second outlet 20. The valve member 7 is arranged within the housing 3 so as to form a first conduit 11 connecting the inlet 5 to the first outlet 10. Alternatively, the valve member 7 may be arranged within the housing 3 to form a second conduit 21 connecting the inlet 5 to the second outlet 20 in a second predetermined position. FIGS. 1a through 1d show the gas flow and sound control valve 1 with its valve member 7 in this predetermined second position. As can easily be conceived, the first predetermined position in which the valve member 7 forms a conduit 11 connecting the inlet 5 to the first outlet 10 would be mirror-symmetrically to the second predetermined position illustrated in the drawing 1A through 1D, which is not shown in detail.

In the first predetermined position the valve member 7 closes the second conduit 21. In a second predetermined position, the valve member 7 closes the first conduit 11. It shall be clear that the valve may be designed in a way that leaves a small gap 35 in the radial direction between the valve member 7 and the housing 3 so that the valve member 7 may not seal the respective closed first or second conduit 11, 21 in an air-tight manner.

The valve member 7, as shown in detail in FIG. 2, is rotatable about a valve axis $A_V$. The valve member 7 comprises a spoon-shaped section, which might also be called a three-dimensionally curved section 71. The three-dimensionally curved section 71 of the valve member 7 forms an inner surface 75 shaped in a convex manner relative to the valve axis $A_V$. The three-dimensionally curved section 71 of the valve member 7 is radially offset relative to the valve axis $A_V$.

The upstream end of the spoon-shaped section 71 may define a generally circular cross-section coaxial with respect to the valve axis $A_V$. The downstream tip of the spoon-shaped section may be arranged on the valve axis or in close proximity thereto. This design of the valve member 7 permits a rotation of the valve member 7 about its axis $A_V$ within the tubular housing 3 and allows for an undisturbed flow of exhaust gas in the axial direction along the valve member 7.

The valve member 7 is arranged in the housing 3 such that the valve axis $A_V$ is aligned parallel to (and may even be aligned coaxially to) a centerline $A_5$ at the inlet 5 of the housing 3. When the inlet 5 as shown in the Figures has a circular cross-section, the centerline $A_5$ may be defined by leading through the circle center.

As shown in FIGS. 1a through 1d and 3a through 3d, the spoon-shaped section 71 of the valve member 7 is dimensioned to cover most or all of the respective second or first conduit 21 or 11 in a predefined first or second position. In the circumferential direction relative to the valve axis $A_V$, the spoon-shaped section 71 extends around the valve axis such that it may completely cover one conduit and completely leave another conduit open. The circumferential extension β of the spoon shaped section may be approximately 180°, for example 185°±5°. In the example shown in the Figures, in which the housing has two outlets 10 and 20 to form a first conduit 11 or a second conduit 21, and in which the centerline $A_5$ of the inlet 5, the centerline $A_{10}$ of the first outlet 10 and the centerline $A_{20}$ of the second outlet 20 are arranged in one single plane, the spoon-shaped section 71 may be designed to extend for approximately 180° around the valve axis $A_V$.

The extension of the spoon-shaped section 71 of the valve member 7 along the axial direction of the centerline $A_5$ of the inlet 5 and the valve axis $A_V$ shall be designed to selectively cover one of the conduits 11 or 21. In a preferred embodiment, the extension of the spoon-shaped section 71 along the axial extension may be more than 3 cm and less than 10 cm. The spoon-shaped section 71 or three-dimensionally curved section is curved around the axis $A_V$ of the valve member and it is also curved in the axial extension along the valve axis $A_V$. The spoon-shaped section 71 may display a partial bell shape, in particular the shape of an axially divided rotated parabola, rotated hyperbola or other rotated curve.

In the Figures, the valve 1 is designed with a first outlet 10 and a second outlet 20 having the same shape and diameter. The inlet 5 shown in the Figures has the same size and shape as the first and second outlets 10 and 20. The first outlet 10 and the second outlet 20 may be of different size and/or shape and (not shown in detail). The inlet 5 and the outlets 10 and 20 may be of different sizes and/or shapes (not shown in detail). The number of outlets may differ from two.

The inside surface 75 of the valve member 7 along its spoon-shaped section 71 defines a continuously curved-pipe-like flow path for the exhaust gas. The inside surface 75 may define a radius of curvature that is variable or, preferably, constant. The radius of curvature $R_7$ is preferably designed in relation to the housing 3 such that its radius of curvature $R_7$ arcs around a center of curvature equal or at least approximately equal to the center of curvature of which a curved centerline that arcs from the inlet 5 to either the first outlet 10 or the second outlet 20 arcs (cf. FIG. 1b).

The outlets 10 and 20 define centerlines $A_{10}$, $A_{20}$ which may be defined by lines through the centers of a possibly circular cross-section of the outlets 10, 20. The centerlines $A_{10}$ and $A_{20}$ are arranged with an angular offset $\alpha_2$ relative to the centerline $A_5$ of the inlet. As shown in the Figures, the angular offset may be 45°. The angular offset $\alpha_1$ of the first outlet 10 may be the same or different in comparison to the angular offset of the centerline $A_{20}$ of the second outlet 20. The housing 3 defines a radius of curvature $R_{10}$ or $R_{20}$ spanning from the inlet 5 to the first outlet 10 and to the second outlet, respectively. In the first predefined position, the radius of curvature $R_7$ of the valve member corresponds to the first radius of curvature $R_{10}$. In the second predefined position, the radius of $R_7$ of the valve member corresponds to the second radius of curvature $R_{20}$. Thereby, in the first as well as in the second predefined positions, the exhaust gas streaming from the inlet 5 to the respective first outlet 10 or second outlet 20 may be guided along a constant radius of curvature to avoid vortices.

The valve is designed so that in the first and second predefined positions, the exhaust gas flow resembles that of a bent pipe having exactly one bend and preferably being formed free of any obstacles.

Figure 3C:
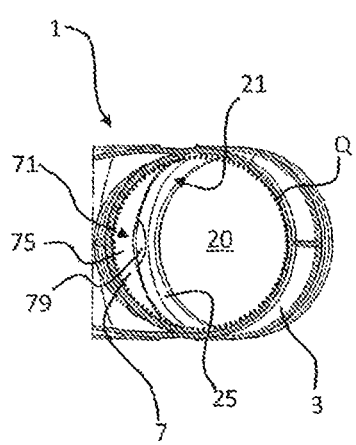

The exhaust gas flowing through the inlet 5 from the valve unit 7 to one of the first or the second outlets 10 or 20 flows along an essentially constant cross-sectional flow area Q in the Figures, particularly FIGS. 3a to 3d. This constant cross-sectional flow area Q is circular, as indicated with dashed lines in FIGS. 3b through 3d. Coming from the combustion engine, the exhaust gas enters to the housing 3 and the valve 7 at the upstream inlet 5 as shown for example in FIG. 3b. The exhaust gas is then guided by the curved shape of the housing 3 in conjunction with the valve member 7, in particular the spoon-shaped section 71. FIG. 3c shows a cross-section along the curved flow path of the exhaust gas through the valve 1 at a central part of the spoon-shaped section 71. As can be seen from FIG. 3c and indicated in dotted line, unlike in prior art valves, the cross-sectional area through which the exhaust gas flows along the valve member 7 remains essentially circular and preferably changes neither in size nor in shape with respect to the cross-sectional area at the inlet sides of the valve.

Figure 3D:
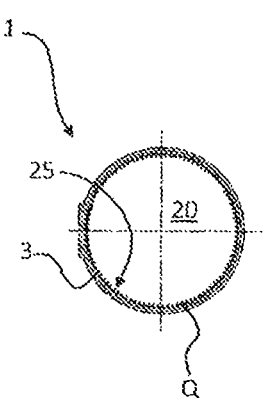

FIG. 3d shows the cross-sectional area through which the exhaust gas flows at the second outlet 20, which is also circular and of the same throughflow-area as the two previous cross-sections. It shall be clear that the illustrations are schematic and not precisely of the same scale.

The valve member may be rotatably mounted to the housing 3 with one or more bearings. One radial bearing 31 of the valve member 7 may be a sliding bushing 32 and the upstream end thereof 7 close to the inlet 5. For engaging the sliding bushing 32, the valve member 7 may include a ring section 73 that may surround the valve axis $A_V$ completely circumferentially. The valve member 7 may be mounted to the housing 3 with a central axial bearing 37. The axial bearing 37 may be arranged in the housing 3 between its outlets 10 and 20. The valve member 7 may include a shaft section 77 aligned coaxially with the valve axis $A_V$. The shaft section 77 of the valve member 7 may extend through the central bearing 37 and through the housing 3. The shaft section 77 may be connected directly or via a transmission to an actuator (not shown in further detail) for turning the valve member 7 within the housing 3.

The valve member 7 may further include a wedge-shaped transition section 76 arranged between the spoon-shaped section 71 and the shaft section 77. Such a transition section 76 may extend circumferentially around the axis $A_V$ to form an umbrella-like cover for the shaft section 77 to guard the axial bearing 37 from exhaust gas and/or to realize a cover to protect the exhaust gas from pockets in the vicinity of the axial bearing 37. The transition section 76 defines a shoulder 78 wider than the shaft section 77 engaging the central bearing 37. The transition section extends, as shown for example in FIG. 3b, 3c or 1b, from the spoon-shaped section 71 into the respective open conduit 11 or 21. A transition surface 79 of the transition section 76 may be designed to correspond to that of the respective open conduit 11 or 21 to connect a conduit surface 15 or 25 to the inside surface 75 of the spoon-shaped section 71.

In addition to the first predetermined position and the second predetermined position, the valve member 7 may be situated within the housing 3 to be arranged in one or more intermediate positions between the first and second predefined position. In an intermediate position, the valve member 7 guides the exhaust gas flow and sound from the inlet 5 to both the first outlet 10 and to the second outlet 20. In the intermediate positions, the valve member may partially cover the first conduit 11 and/or the second conduit 21. By partially opening the conduits 11 and 21, the valve member 7 may allow exhaust gas to flow partially through the first conduit 11 and partially through the second conduit 21. The ratio of exhaust gas flow through the first outlet 10 relative to the exhaust gas flow through the inlet 5 depends on the rotational distance of the current intermediate position relative to the first predefined position. For example, in the first predetermined position, the valve member 7 would turn 0° from the first predetermined position, thereby leaving the first conduit 11 entirely open and guiding 100% of the exhaust gas from the inlet 5 to the first outlet 10. Conversely, in the second predetermined position the valve number as shown in the Figures would be rotated 180° away from the first predetermined position to completely close the first conduit 11 so that 100% of the exhaust gas would flow from the inlet 5 to the second outlet 20. 0% of the exhaust gas would flow from the inlet 5 to the first outlet 10. As described above, a small gap 35 may be provided between the valve member 7 and the housing 3 which may cause slight deviations from 100% or 0% throughflow. These slight deviations can usually be considered as insignificant and for a matter of the subject-matter of this patent application, the terms "completely open" and "completely closed" shall be understood to relate to a valve 1 in which a small gap 35 may be present.

It has been shown that the ratio of flow from the inlet through the second conduit 21 to the second outlet 20 can be estimated to be proportional to the rotational distance of the valve 7 from the first predetermined position.

Referring particularly to FIGS. 1b and 1c, the valve member 7 and in particular its ring section 73 may be arranged concentrically or may be even coaxially to the inlet 5. The upstream end of the valve member 7, as may be realized by the ring section 73 can have an identical inner diameter $D_7$ corresponding to the inner diameter $D_5$ of the inlet 5. This avoids any change in the cross-section through which the exhaust gas flows.

The valve member 7 may consist of one integral member forming the spoon-shaped section 71 as well as the shaft 77 section and/or a ring section 73 for engaging an upstream bearing. The transition 76 section and/or the shoulder 78 may also be part of the integral one-piece valve member 7. An integral one-piece valve member may be manufactured in a 3D-printing process.

FIG. 4 shows a first embodiment of en exhaust gas system 100 comprising an exhaust gas flow and a sound control valve 1. The exhaust gas flow c from the engine enters the exhaust gas system 100 at an upstream point of entry. After flowing through the exhaust gas system 100, a flow c' leaves the exhaust gas system. Upstream and/or downstream of the exhaust gas system 100, further components may be arranged (not shown in further detail), for example one or more junctions for dividing or joining partial streams of exhaust gas, for example from a bank of cylinders, exhaust gas cleaning devices, such as catalyzers, one or more mufflers, etc. Downstream of the exhaust gas system 100 shown in FIG. 4, at least one outlet to the atmosphere is provided.

Within the exhaust gas system 100, the incoming flow c of exhaust gas can be directed from one central inlet to either a right exhaust tract 13, a left exhaust tract 23 or partially through both the right exhaust tract 13 and the left exhaust tract 23. The guidance of the incoming exhaust gas stream c into the left and/or right exhaust tract 13, 23 is performed by the valve 1. The valve 1 may redirect the incoming flow c completely or in part into a stream $c_{11}$ through the first conduit 11 of the valve 1 into the right exhaust tract 13. The valve 1 may redirect the incoming stream c of exhaust gas completely or in part into a stream $c_{21}$ through the left conduit 21 into the left exhaust gas tract 23. As described above, the ratio of flow through the first and/or second conduit 11, 21 and consequently through the right or left exhaust tract 13, 23 may be controlled by the positioning of the valve member 7 within the housing 3 of the valve 1. It shall be clear that the terms "left" and "right" are used in conjunction with the illustrations for ease of understanding. As the valve 1 and the exhaust gas system 100 may be designed essentially mirror-symmetrical, so that the terms "left" and "right" may be used interchangeably. For the sake of ease of understanding, the terms "right" and "left" shall be understood as being interchangeable with the terms "first" and "second" as used in the claims. It shall be clear that the "first" and "second" conduit, tract, opening, etc. refer to distinct components of one valve or system. In other words, the use of the terms "first" and "second" imply the presence of at least two or more components as described.

In the embodiment shown in FIG. 4, the right exhaust tract 13 is provided with an acoustic element 41. An acoustic element may be a resonator, an expansion chamber, a Helmholtz resonator, a muffler, an absorption muffler, or the like. Generally, an acoustic element 41, 43, 45 or 47 shall be understood to be any component of the exhaust gas system to modify, particularly amplify and/or attenuate the sound emissions from the internal combustion engine. The acoustic element may be designed to modify acoustic emissions within the first frequency band differently than sound emissions in a different, second frequency band. For example, an acoustic element may be designed to amplify sound emissions in a first frequency band and to attenuate sound emissions in a second frequency band.

In the embodiment of an exhaust system 100 shown in FIG. 4, the left exhaust tract 23 consists of a pipe that is not provided with an acoustic element. It shall be clear that the second or left exhaust tract 23 may alternatively also be provided with an acoustic element (not shown).

Downstream of the valve 1 which divides the incoming flow c into the first flow $c_{11}$ through the first conduit 13 and into a second flow $c_{21}$ through the second tract 23, a unification junction 50 is arranged where the first flow $c_{11}$ and the second flow $c_{21}$ are rejoined to the joined flow c' in the exhaust system outlet tract 51. In the exhaust system outlet tract 51, an additional common acoustic element may be arranged (not shown in detail). The left and right tracts 13, 23 in conjunction with the unification junction 50 may be designed to form an acoustic element by designing the pipe of the first tract 13 to differ in length from the pipe of the second tract 23 between the valve 1 and the junction 50. The difference in length of the first tract 13 and the second tract 23 may be designed in correspondence with predefined frequencies of sound emission from the internal combustion engine in order to achieve negative and/or positive interference effects to modify the sound. If the first and second tracts 13 and 23 in conjunction with the junction 50 are designed to form an acoustic element, the individual tracts 13 and 23 may or may not be provided with additional acoustic elements.

Figure 5:
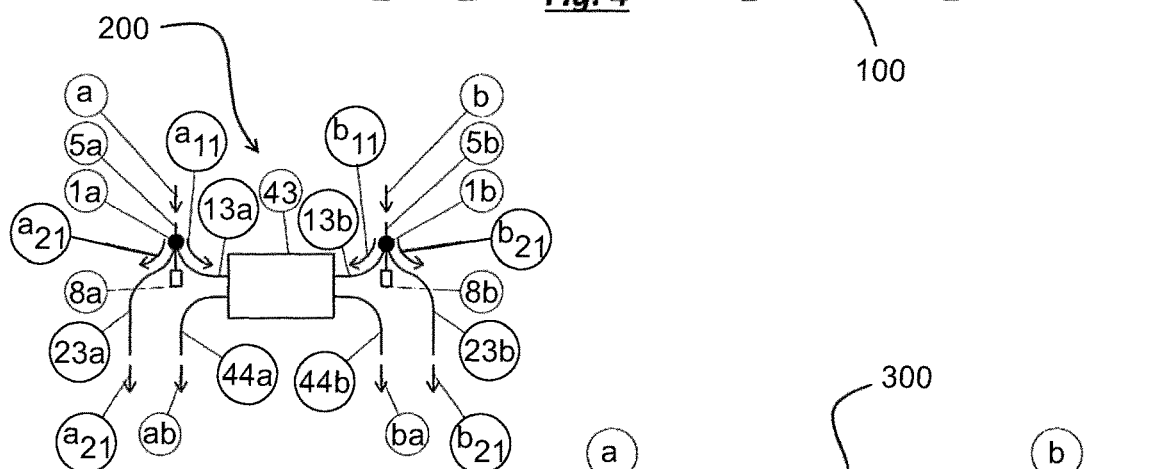
FIG. 5 another embodiment of an exhaust gas system including two gas flow and sound control valves.

The exhaust gas system 200 shown in FIG. 5 receives two different incoming streams a, b. Preferably, the first stream a of exhaust gas comes exclusively from a first group of cylinders and the second stream b comes exclusively from a second group of cylinders of an internal combustion engine. In this regard, reference is made to the applicant's patent application EP 3 141 720 A1, particularly paragraphs [0002], [0007], [0008], [0026], [0043], [0044] and [0108], which are incorporated by reference in their entirety into the present application. The exhaust system 200 comprises a first exhaust gas flow and sound control valve 1a for the first incoming flow a, and a second valve 1b for the second stream b. Each of the valves 1a and 1b have a respective second outlet 20 leading to a respective bypass line 23a, 23b to discharge a flow $a_{21}$, $b_{21}$, possibly through an exhaust gas processing component or an acoustic element (not shown in further detail) to the atmosphere, with or preferably without mixing the bypass exhaust stream $a_{21}$, $b_{23}$ with exhaust gas from the respective incoming other stream b or a.

Each of the first and the second valve $1_a$, $1_b$ has a respective first outlet 10 connected to a respective first tract 13a, 13b, both of which tracts 13a, 13b lead to a singular common acoustic element 43. In the common acoustic element 43, acoustic emissions travelling with both of the incoming streams a and b may be modified. The common acoustic element 43 may be selected from the group of acoustic elements described above. Furthermore, the common acoustic element 43, may be realized as a common exhaust gas cleaning and/or silencing device as described in EP 3 118 429 A1, which is incorporated by reference in its entirety, wherein it shall be clear that a valve in accordance with the present invention shall be used upstream of the common exhaust gas cleaning and/or silencing device instead of the shut-off devices (reference numerals 43, 45 of EP 3 118 429 A1).

The common acoustic element 43 has one or more outlet conduits 44a, 44b for guiding one or more possibly mixed streams ab, ba of exhaust gas directly or indirectly towards the atmosphere.

In the embodiment of an exhaust gas system 200 illustrated in FIG. 5, the first and second valves 1a, 1b may be controlled identically, exclusively differently or independently. The guidance and/or division of the incoming stream a, b of exhaust gas into a first stream $a_{11}$, $b_{11}$ and/or a second stream $a_{21}$, $b_{21}$, respectively. Each valve 1a, 1b may be controlled by positioning the valve member 7 within the housing 3 of the valve as described above. Only one valve 1a or 1b, or both valves 1a and 1b may be designed to guide exhaust gas exclusively through the respective second conduit 21 to the bypass line 23a, 23b. Only one valve 1a or 1b or both valves 1a and 1b may be controlled to guide incoming exhaust gas a and/or b exclusively through their respective first conduits 11 to the common acoustic element 43. Only one valve 1a or 1b or both valves 1a and 1b may be controlled to guide incoming exhaust gas a and/or b so that it is divided into a respective first stream $a_{11}$, and/or $b_{11}$ and into a respective second stream $a_{21}$ and/or $b_{21}$. The respective first and second valves 1a and 1b can be controlled dependent on an engine setting, a performance setting and/or a desired sound output setting to guide exhaust gas from the internal combustion engine through the exhaust gas system for a desired modification of the acoustic emission, engine performance and/or cleaning performance.

Figure 6:
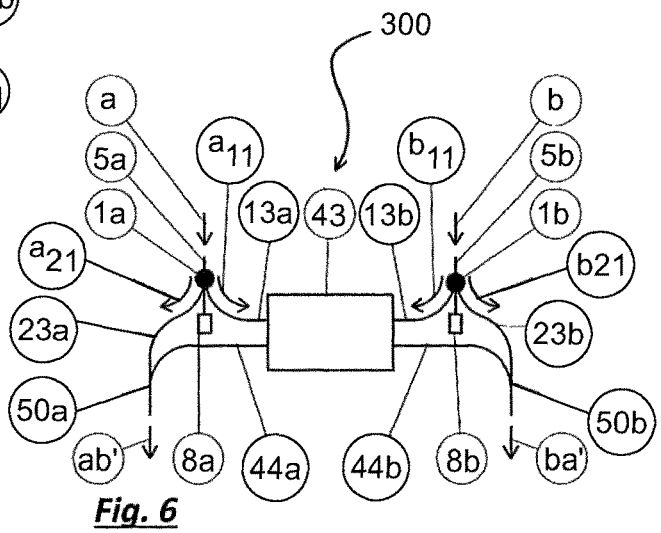
FIG. 6 another embodiment of an exhaust gas system including a gas flow and sound control valve.

A further embodiment of an exhaust system 300 is shown in FIG. 6. The exhaust system 300 of FIG. 6 differs from exhaust system 200 shown in FIG. 5 in that the outlet conduits 44a and 44b are arranged to guide exhaust gas from the common acoustic element 43 to be joined with the exhaust gas flowing through the bypass tracts 23a and 23b. The right exhaust bypass line 23 and the right outlet conduit 44a are joined in a junction 50a Where an exhaust gas stream $a_{21}$ may be joined with an exhaust gas stream exiting from the common acoustic element 43 to realize a mixed outlet stream ab'. The design with the left tract portion may be essentially mirror-symmetrically so that a stream $b_{21}$ to the second bypass line 23 is joined with exhaust gas stream coming from the common acoustic element 43 through the left outlet conduit 44b in the left junction 50b to realize another mixed exhaust gas stream ba'.

If a junction 50, 50a, 50b as described with respect to the embodiments of exhaust systems 100 or 300 of FIG. 4 or FIG. 6 is used, acoustic modifications may be achieved even if one of the lines upstream of the junctions 50, 50a or 50b is not supplied with an incoming stream by using it as an echo chamber or resonance chamber.

FIG. 7 shows another embodiment of an exhaust gas system 400. The exhaust gas system 400 may be a subassembly within a larger exhaust gas system, for example an exhaust gas system 100, 200 or 300 as described above. The exhaust gas system 400 comprises a main line 55 receiving a stream d of exhaust gas directly or indirectly from an engine. The main line 55 discharges a stream of exhaust gas d' directly or indirectly towards the atmosphere. A main line 55 can be understood to be a right or left exhaust tract 13, 13a, 13b, 23, 23a and/or 23b as described above. Alternatively or additionally, the main line 55 can be understood as a line upstream of a valve 1, 1a and/or 1b and/or a bypass line 23a and/or 23b, and/or an outlet conduit 44a and/or 44b, and/or a common exit line 54, 54a and/or 54b.

In the exhaust gas system 400 shown in FIG. 7, an impasse side tract 5' is connected to the main tract 55. Exhaust gas that enters the impasse side tract 5' from the main tract 55 cannot exit to the atmosphere directly from the impasse side tract 5' but must re-enter the main tract 55 before being able to exit directly or indirectly to the atmosphere. In the exhaust gas system 400, an exhaust gas flow and sound control valve 1 is arranged within the impasse side tract 5'. Each of the outlets 10, 20 of the valve 10 is connected to one respective impasse acoustic element 45, 47. The impasse acoustic elements 45, 47 may be selected from a group of impasse acoustic elements as described above. Preferably, the first impasse acoustic element 45 and the second impasse acoustic element 47 realize different acoustic modifications. For example, the first impasse acoustic element 45 may be designed to amplify sound emission whereas the second impasse acoustic element 47 may be designed to attenuate sound emissions. Alternatively or additionally, the first impasse acoustic element 45 may be designed to amplify sound emission of a first frequency band whereas the second impasse acoustic element 47 is designed to amplify sound emissions to a second frequency band. Any exhaust gas that entered one of the impasse acoustic elements 45, 47 can exclusively vent to the atmosphere via the main line 55, preferably by reversing the exhaust gas flow from the respective impasse acoustic element 45, 47 through the above-mentioned valve 1. The valve 1 may be controlled to divide a stream of exhaust gas coming from the impasse side tract 5' into a first stream $d_{11}$ and into a second stream $d_{21}$. The control and possible settings of the valve 1 correspond to those described above.

Features disclosed in the above description, the figures and the claims may be significant for the realization of the invention in its different embodiments individually as well as in any combination thereof.

LIST OF REFERENCE SIGNS

1, 1a, 1b control valve
3 housing
5 inlet
5a right exhaust tract
5b left exhaust tract
5' impasse side tract
7 valve member
8 actuator
10 first outlet
11 first conduit
13, 13a, 13b first tract
15, 25 conduit surface
20 second outlet
21 second conduit
23, 23a, 23b second tract
31 radial bearing
32 sliding bushing
35 gap
37 central axial bearing
41, 43, 45, 47 acoustic element
44a, 44b outlet conduit
50, 50a, 50b junction
51 outlet tract
54, 54a, 54b exit line
55 main line
71 spoon-shaped section
73 ring section
74 outer surface
75 inner surface
76 transition section
77 shaft section
78 shoulder
79 transition surface
100, 200, 300, 400 exhaust gas system
$\alpha_1, \alpha_2$ angular offset
$\beta$ circumferential extension
$A_V$ valve axis
$A_5, A_{10}, A_{20}$ centerline
a, b incoming flow
$a_{21}, b_{21}, a_{23}, b_{23}$ discharge flow
ab, ba, ab', ba' mixed flow
c, c', $c_{11}, c_{21}$ exhaust gas flow
d, $d_{11}, d_{21}$ exhaust gas flow
$D_5, D_7$ inner diameter
Q flow area
$R_7, R_{10}, R_{20}$ radius of curvature

The invention claimed is:

1. A gas flow and sound control valve for an exhaust system of an internal combustion engine, the gas flow and sound control valve comprising:
    a Y-shaped housing including an inlet, a first outlet, and a second outlet, and a valve member arranged within the Y-shaped housing for forming a first conduit connecting the inlet to the first outlet and a second conduit from the inlet to the second outlet, wherein the valve member is configured to be moved relative to the Y-shaped housing between a first predetermined position in which the valve member closes the second conduit and a second predetermined position in which the valve member closes the first conduit,
    wherein the valve member comprises a spoon-shaped section for guiding exhaust gas from the inlet through the first conduit and/or the second conduit,
    wherein the spoon-shaped section defines an inner surface which, in the first predetermined position or the second predetermined position, merges with an inner conduit surface of a respective open conduit to define a boundary for an exhaust gas flow path resembling that of a bent pipe,
    wherein the valve member is rotatable around a valve axis aligned parallel to a centerline of the inlet,
    wherein the valve member is rotatably mounted to the Y-shaped housing with a central bearing arranged in the Y-shaped housing between the first outlet and the second outlet,
    wherein the valve member includes a shaft section aligned coaxially with the valve axis and extending through the central bearing and through the Y-shaped housing,
    wherein the valve member includes a wedge-shaped transition section arranged between the spoon-shaped section and the shaft section, and
    wherein the wedge-shaped transition section extends, in the first or second predetermined position, radially from an upstream tip of the spoon-shaped section into the respective open conduit and having a transition surface shaped corresponding to that of the respective open conduit and connecting the inner conduit surface of the respective open conduit to the inside surface.

2. The gas flow and sound control valve according to claim 1, wherein the spoon-shaped section is dimensioned such that it covers the second conduit in the first predetermined position and such that it covers the first conduit in the second predetermined position.

3. The gas flow and sound control valve according to claim 2, wherein the spoon-shaped section extends in a circumferential direction around the valve axis for at least 170°, and at most 220° along an axial extension along the valve axis of more than 3 cm.

4. The gas flow and sound control valve according to claim 2,
    wherein an inside surface of the spoon-shaped section defines a curved pipe-like flow path for the exhaust gas defining a radius of curvature, and
    wherein the spoon-shaped section is formed such that it defines an approximately constant cross section of the flow path in the first and second predetermined positions.

5. The gas flow and sound control valve according to claim 4,
   wherein centerlines of the outlets are arranged with an angular offset between 10° and 120° relative to the centerline of the inlet or the valve axis,
   wherein the Y-shaped housing defines a first radius of curvature spanning from the inlet to the first outlet and a second radius of curvature spanning from the inlet to the second outlet, and
   wherein in the first or second predetermined position the radius of curvature of the valve member corresponds to the respective first or second radius of curvature.

6. The gas flow and sound control valve according to claim 2, wherein an inner surface which, in the first or second predetermined position, merges with an inner conduit surface of the respective open first or second conduit to define a boundary for the exhaust gas flow path resembling that of a bent pipe, comprising exactly one bend and/or being formed free of obstacles within the respective open first or second conduit.

7. The gas flow and sound control valve according to claim 6,
   wherein the path of exhaust gas flowing from the inlet along the valve member to the first or second outlet through the respective conduit defines an essentially constant cross sectional area, and
   wherein an inlet funnel is arranged upstream of the inlet for guiding the path from another cross section to the cross sectional area of the inlet.

8. The gas flow and sound control valve according to claim 6, wherein a gap is defined in a direction radial relative to the valve axis between a radially outer surface of the spoon section and the Y-shaped housing at least partially along an axial extension of the spoon section.

9. The gas flow and sound control valve according to claim 1,
   wherein the valve member is rotatably mounted to the Y-shaped housing with an upstream bearing at the inlet, and
   wherein the valve member includes a ring section coaxially surrounding the valve axis and engaging the upstream bearing.

10. The gas flow and sound control valve according to claim 1,
    wherein the wedge-shaped transition section defines a shoulder wider than the shaft section and engaging the central bearing.

11. The gas flow and sound control valve according to claim 1, further comprising an actuator for manipulating the valve member,
    wherein the actuator is configured to arrange the valve member in at least one intermediate position between the first and second predetermined positions such that the valve member is positioned for guiding an exhaust gas flow and sound from the inlet to the first outlet and the second outlet while partially covering the first conduit and the second conduit.

12. The gas flow and sound control valve according to claim 9, wherein an upstream end of the valve member and the inlet are concentrically, aligned and/or have identical inner diameters corresponding to one another.

13. The gas flow and sound control valve according to claim 6,
    wherein the path of exhaust gas flowing from the inlet along the valve member to the first or second outlet through the respective conduit defines an essentially constant cross sectional area, and
    wherein an inlet funnel is arranged upstream of the inlet for guiding the path from an elliptical cross section to the cross sectional area of the inlet.

14. The gas flow and sound control valve according to claim 1,
    wherein the valve member is rotatably mounted to the Y-shaped housing with an upstream bearing that comprises a sliding bushing, at the inlet, and
    wherein the valve member includes a ring section coaxially surrounding the valve axis and engaging the upstream bearing.

* * * * *